Oct. 20, 1931.                W. J. BESLER                1,828,386
                    BRAKE MECHANISM FOR MOTOR VEHICLES
                           Filed May 18, 1928
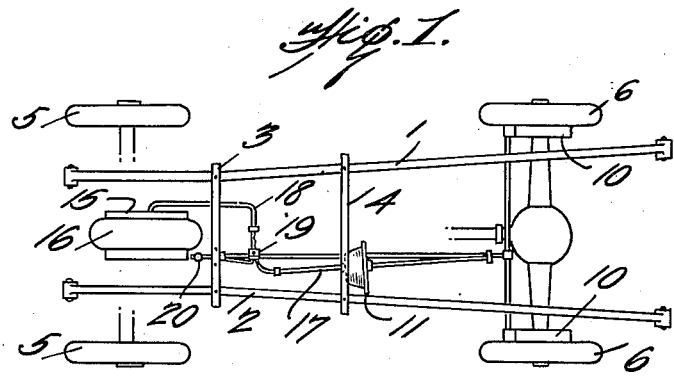
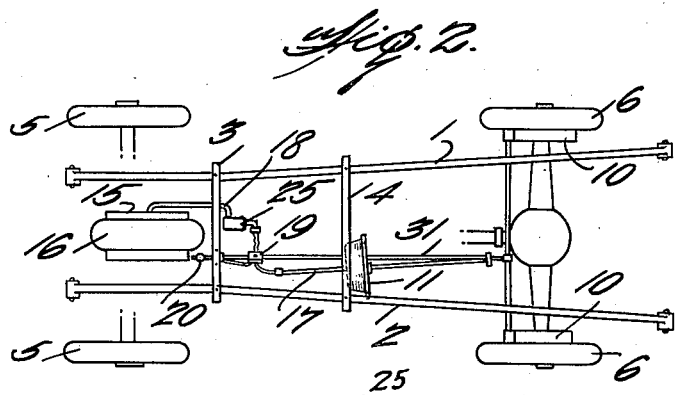
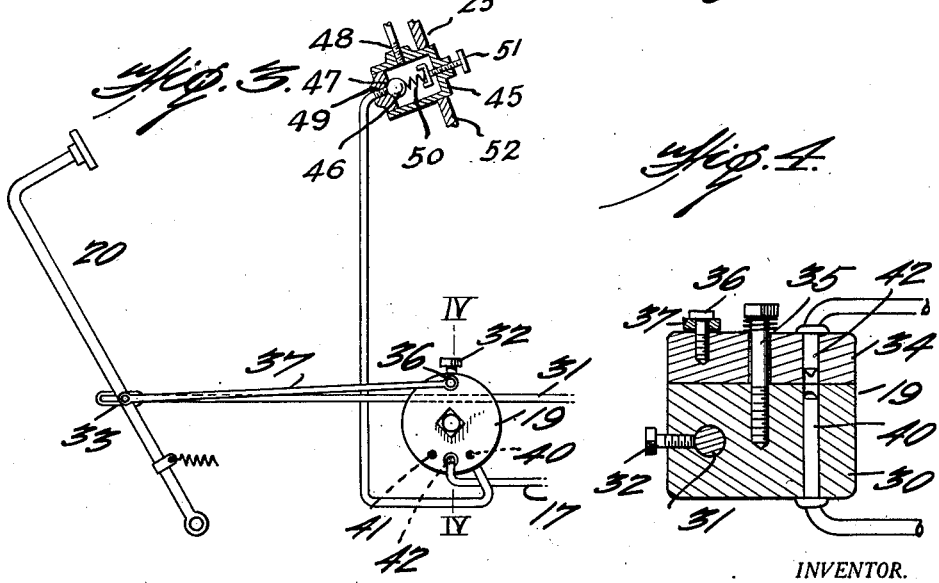
INVENTOR.
William J. Besler
BY
ATTORNEY.

Patented Oct. 20, 1931

1,828,386

UNITED STATES PATENT OFFICE

WILLIAM J. BESLER, OF PLAINFIELD, NEW JERSEY

BRAKE MECHANISM FOR MOTOR VEHICLES

Application filed May 18, 1928. Serial No. 278,721.

My invention relates to brake mechanism for motor vehicles and more particularly to brake mechanism of the fluid-pressure operated or servo-motor type, this application being a continuation in part of my copending application Ser. No. 199,801, filed June 18, 1927, issued June 12, 1928, No. 1,673,177.

In the design of servo-motor brake mechanism, it is customary to provide a motor device which is sufficiently powerful to exert a greater braking effort than the minimum effort required to control the vehicle. It is clear therefore that particulary where such mechanism is designed for a large vehicle and is also used for a smaller vehicle, the motor is appreciably larger than necessary. The disadvantage of this result is that when the vehicle is operated by careless or inexpert drivers, the brakes are frequently applied with excessive rapidity and force, resulting in rapid wear of the brakes and tires. Furthermore, the use of such mechanism is dangerous under some circumstances inasmuch as it is relatively difficut to avoid "dragging" the wheels which under some road conditions induces skidding.

Not only is it difficult to select a servo-motor of the size which is properly proportioned to the weight of the vehicle and its particular braking system, but in actual operation this proportion is soon upset due to the variance in the amount of effort necessary to stop the car under varying conditions of the brake bands which may be new and grip easily, or old and worn smooth, or wet, or covered with oil.

It is an object of my invention to provide simple and reliable means for adjusting the effectiveness of the power actuating mechanism and more particulary to limit the power exerted thereby below that necessary to drag the wheels of the vehicle.

A further object of my invention is to provide a means whereby the driver can decrease or increase the strength of the servo-motor to meet varying conditions of the braking system. Thus he can have a powerful force to apply when the brake bands are not gripping well and modify this force so that application will not be too severe or liable to cause dragging of the wheels when the brake bands are holding well.

A relatively powerful motor device may be employed, the same size being used for different sizes of vehicles and the effectiveness of the operating mechanism is controlled by the auxiliary controlling device.

In its broader aspect, the invention contemplates the correlating of the force that may be exerted by the brake motor to the size and braking equipment of the vehicle in order that it may be difficult or impossible to drag the wheels of the vehicle under ordinary braking conditions. However, I consider it preferable to provide a brake motor of ample size and limit the operating force of the motor by means of an auxiliary controlling device as set forth above so that the mechanism may be further adjusted at will to the varying conditions of the braking system.

In accordance with a preferred embodiment of the invention, the auxiliary controlling device may comprise a simple reducing valve in the fluid-pressure line between the intake manifold of the engine and the fluid-pressure motor. The reducing valve, which may be adjustable, is effective to control the pressure of the fluid supplied to the motor, and accordingly serves to limit the power thereof to attain the desired results.

Other objects and advantages of my invention will appear from the following detailed description of the embodiments shown in the accompanying drawings.

Referring to the drawings, Fig. 1 is a plan view of brake mechanism embodying the invention as applied to an automotive vehicle;

Fig. 2 is a similar view of a modified form of the invention embodying an adjustable controlling device for the servo-motor;

Fig. 3 is a detail view of the control lever, a main control valve and auxiliary valve of the brake mechanism shown in Fig. 2; and Fig. 4 is a detail sectional view of the main control valve taken on the line IV—IV of Fig. 3.

A portion of the chassis of an automotive vehicle is shown conventionally in Fig. 1, and comprises a frame including longitudinal members 1 and 2 and cross members 3 and 4 mounted in any suitable manner upon front and rear wheels 5 and 6, respectively. For the purposes of illustration, the rear wheels 6 of the vehicle are shown as provided with friction brakes 10 of any usual type which are rendered operative by one or more power-actuating devices such as the fluid-pressure motor 11.

It will be understood that the form and arrangement of the brakes 10 or the type of servo-motor 11 and the devices for controlling the same to apply and release the brakes constitute no part of the present invention. However, the motor 11 may be of the fluid-pressure type and connected to a suitable source of power, such as the intake manifold 15 of the engine 16, through the pipe connections 17 and 18 and a control valve 19, the latter being operatively connected to a brake pedal 20. The detailed construction of the control valve 19 is shown in Figs. 3 and 4, to be described in connection with the modification of Fig. 2, and the operation will become clear from the following description of this modified form of the invention.

The inventive concept involved in the modification of Fig. 1 resides in the correlation of the size or power of the servo-motor 11, taking into consideration the normal available pressure of the operating fluid where a fluid-pressure motor is employed, with the characteristics of the friction brakes 10 and the weight of the vehicle equipped with the brakes in order to obtain the new and desirable result; namely, a limitation of the braking effort of the servo-motor such that full energization thereof shall be ineffective to "drag" the wheels 6 of the vehicle under predetermined road conditions, preferably upon a dry, smooth dirt or concrete road surface. This result is therefore obtained by a suitable poportioning of the parts of the braking mechanism and must be arrived at by experimentation for different vehicles and different types and sizes of friction brake elements.

The braking effort of the servo-motor may be supplemented, if necessary, by manual pressure upon the lever 20 in the modification shown, so that as much effort may be exerted as may be required under any conditions. On the other hand, since the maximum deceleration of the vehicle is attained just before the wheels begin to slip on the pavement, the natural tendency of the operator or driver to rely on a full application of the servo-motor to effect a sudden stop results in a braking operation of maximum efficiency without the exercise of any particular skill. Furthermore, the limitation placed upon the power of the braking mechanism has the further advantage that during the ordinary operation of the vehicle by careless or unskilled drivers, accidental "dragging" of the wheels is substantially prevented, thereby obviating the resultant wear and derangement of the brakes and tires, and reducing the danger from the skidding sometimes caused thereby.

In order to compensate for the varying conditions of the road and the physical changes of the braking system brought on by wear, grease or water on the linings, without changing the size of the servo-motor, a large motor may be used and an auxiliary controlling device employed to limit the effectiveness of the motor. In the case of a fluid-pressure motor, a throttling or pressure-reducing valve, preferably adjustable from the driver's seat may be arranged in the line leading to the motor.

For example, as shown in Fig. 2, an auxiliary valve 25 may be connected in the pressure line between the intake manifold 15 and the motor 11. The valve 25 may be arranged in the pipe connection 18 in series with the main control valve 19.

The detailed construction of the main and auxiliary controlling valves may be similar to that shown in Figs. 3 and 4. As shown herein for purposes of illustration, the main control valve 19 comprises a cylindrical base member 30 adapted to receive the brake rod 31, which extends between the foot pedal 20 and the brakes 10. The valve 19 is secured in position upon the brake rod 31 by any suitable means, such as a threaded locking screw or bolt 32. It will be understood that the brake rod 31 provides a direct mechanical connection between the brake pedal 20 and the brakes 10. However, the forward end of the brake rod 31 is provided with a slotted portion 33 to provide a predetermined amount of lost-motion in order that the initial movement of the brake pedal shall be effective to actuate the control valve 19 before the brake pedal engages the brake rod 31.

The control valve 19 further comprises a member 34 pivoted as indicated at 35 upon the base portion 30 and connected through a pin 36 and rod 37 to the brake pedal 20. The base member 30 of the valve 19 is provided with two spaced port openings 40 and 41 (see Fig. 3), and the pivoted element 34 of the valve is provided with a cooperating port opening 42 adapted to register with the port openings 40 and 41 when the element 34 is turned upon the pivot 35 by the brake pedal.

The auxiliary valve 25 comprises a hollow body portion 45 containing valve member 46 and valve seat 47, the valve member 46 being preferably of the ball type. The body portion 45 of the valve 25 is provided with suitable passages 48 and 49 adapted to be connected to the intake manifold 15 of the engine 16 and to the port 40 of the main control valve 19, as shown. The valve member 47 cooperates with the passage 49 and is held in engagement with the valve seat 47 by means of a spring 50 and an adjusting screw 51. In the embodiment of the invention illustrated herein the source of fluid pressure for operating the servo-motor is the intake manifold of an engine in which the pressure is lower than atmospheric pressure.

The operation of the main control valve 19 serves to connect the servo-motor 11 to the intake manifold 15 to apply the brakes and to exhaust the same to atmosphere through the atmospheric port 41 to release the brakes. The operation is effected by depressing and releasing the brake pedal 20. The depression of the brake pedal 20 serves to rock the valve member 34 in the counter-clockwise direction as shown in Fig. 3, thereby placing the ports 40 and 42 in communication with each other. If the brake pedal 20 is only slightly depressed, the energization of the servo-motor 11 takes up the slack in the brake mechanism and moves the brake rod 31 forward, thereby causing such a relative movement of the valve members 30 and 34 as to seal the port 42 after only a partial application of the brakes. As the brake pedal 20 is further depressed a greater braking effort is exerted until complete energization of the servo-motor 11 is effected.

This maximum braking effort corresponding to complete energization of the servo-motor is determined by the throttling valve 25 and its magnitude may be adjusted by means of the adjusting screw 51 so that the braking effort is insufficient to cause the locking of the wheels of the vehicle under ordinary road conditions. Upon the release of the brake pedal 20, the reverse movement of the valve member 34 with respect to the cooperating valve member 30 brings the ports 41 and 42 into registration and vents the servo-motor 11 to atmosphere, thereby releasing the brakes.

The valve 25 maintains a pressure differential, depending upon the adjustment of the valve spring 50, which is continuously subtracted from the effective pressure for operating the brake motor. The maximum vacuum or subatmospheric pressure for energizing the motor is less than the maximum vacuum of the intake manifold by the amount of the pressure differential across the valve 25. In this manner the maximum suction available for energizing the motor is regulated by the valve 25. In order to prevent locking the wheels of the vehicle when the brakes are applied, the valve 25 is adjusted by the adjusting screw 51 to limit the maximum suction effective on the brake motor below the suction that would cause locking of the wheels of the vehicle.

It will be apparent that the brake mechanism described above possesses several important advantages, particularly with respect to the ease of handling the vehicle so that the full advantages of servo-motor brakes may be utilized by careless or inexpert drivers. Furthermore even in the hands of practiced drivers, the limitation of the power of the brake motor serves to lessen the wear on the brakes and tires because of the correlation of the maximum braking effort that may be exerted to the weight or size of the vehicle and effectiveness of the friction brakes.

It is of advantage to have the reducing valve controllable from the driver's seat, for example by an operating lever or button on the instrument panel 52, so that the brakes may be adjusted quickly and easily at will to suit the condition of the road or changes in the adhesion of the brake bands caused by wetting in rainy weather or other causes. Experience has also shown that it is better to decidedly limit the force of the servo-motor before allowing a driver who is not accustomed to servo-motor brakes to take control of the vehicle as he is liable unintentionally to stop too suddenly which under certain conditions, such as in dense traffic, might cause collision or accident.

It will be apparent to those skilled in the art that the brake mechanism shown and described may be variously modified without departing from the scope of the invention as set forth in the appended claims.

I claim:

1. A braking system for vehicles comprising a brake, a power-actuating device for the brake, means for controlling the power-actuating device to apply and release the brake and means for decreasing by a predetermined constant the effectiveness of said power actuating device.

2. A braking system for vehicles comprising a brake, a fluid-pressure motor for applying the brake, a pipe connection leading to said motor and a pressure-reducing valve in said connection for decreasing the effectiveness of the motor by a predetermined constant amount.

3. A braking system for vehicles comprising a brake, a power-actuating device for the brake, means for controlling the power-actuating device to apply and release the brake and means controllable from the driver's seat for reducing by a desired constant the effective power of the power actuating device.

4. A braking system for vehicles comprising a brake, a fluid-pressure motor for applying the brake, a pipe connection leading to said motor, valve means for controlling the fluid-pressure motor and a pressure-reducing valve in said connection for decreasing by a constant the effectiveness of the motor and controllable from the driver's seat.

5. In a braking system for vehicles embodying brakes jointly controlled by a servo-motor and by a control lever, the initial movement of the control lever rendering the servo-motor operative and the continued movement supplementing the operation thereof in accordance with the extent of movement of said lever, a source of fluid power for said servomotor, means for reducing by a predetermined constant the effectiveness of said fluid power and means for regulating said reducing means.

6. In a braking system for wheeled vehicles, brakes for some of the wheels, a servomotor for operating said brakes, a source of fluid pressure differential for said motor, and regulatable means for reducing the effectiveness of said pressure differential by a predetermined constant to prevent locking of the vehicle wheels.

WILLIAM J. BESLER.